United States Patent [19]

Cheigh et al.

[11] Patent Number: 4,465,447
[45] Date of Patent: Aug. 14, 1984

[54] APPARATUS FOR CONTINUOUSLY EXTRUDING AND DRYING/COOLING CEREAL BRAN

[75] Inventors: Hong Sik Cheigh; Chul Jin Kim, both of Seoul; Dong Chul Kim, Euijeongbu, all of Rep. of Korea

[73] Assignee: Korea Advanced Institute of Science and Technology, Seoul, Rep. of Korea

[21] Appl. No.: 417,161

[22] Filed: Sep. 13, 1982

[30] Foreign Application Priority Data

Feb. 11, 1982 [KR] Rep. of Korea ............ 1013/1982[U]

[51] Int. Cl.³ ...................... B29C 25/00; B29C 17/10
[52] U.S. Cl. ................................ 425/72 R; 425/308; 425/377; 425/378 R; 425/404; 425/456; 425/DIG. 230
[58] Field of Search .......... 425/404, 456, 377, 378 R, 425/DIG. 230, 308, 72 R; 34/164

[56] References Cited

U.S. PATENT DOCUMENTS

| | | | |
|---|---|---|---|
| 325,018 | 8/1885 | Schultz | 198/533 |
| 326,769 | 9/1885 | McClurg | 198/533 |
| 750,262 | 1/1904 | Cooley | 34/164 |
| 2,163,556 | 6/1939 | Glaze et al. | 34/164 |
| 2,371,513 | 3/1945 | Gaffney | 34/164 |
| 3,115,119 | 12/1963 | Brelsford | 198/671 |
| 3,116,715 | 1/1964 | Krumheuer | 198/671 |
| 3,202,746 | 8/1965 | Day et al. | 425/308 |
| 3,393,260 | 7/1968 | Miler | 425/377 |
| 4,332,480 | 6/1982 | Anders | 366/83 |

FOREIGN PATENT DOCUMENTS

| | | | |
|---|---|---|---|
| 109055 | 8/1967 | Denmark | 425/378 |
| 907217 | 3/1946 | France | 100/145 |

Primary Examiner—Willard E. Hoag
Attorney, Agent, or Firm—Holman & Stern

[57] ABSTRACT

An apparatus for continuously extruding and drying/cooling cereal bran is provided. This apparatus comprises a feed screw extending horizontally from the bottom of a hopper, a main screw arranged in the cross direction to said feed screw at a proper position spaced under said feed screw, a frustoconical main screw top which is secured to the end of said main screw, said top being provided with a flight therearound, an agitating means positioned in said hopper, said means being operated intermittently by way of a ratchet gear system being operated by the revolution of said feed screw, a drying/cooling device vibrating at a certain angle of inclination, and a blower system which is connected directly to said drying/cooling device. With use of this apparatus, it is possible to produce even sized enzyme inactivated pellets of bran having a desired size and strength.

7 Claims, 5 Drawing Figures

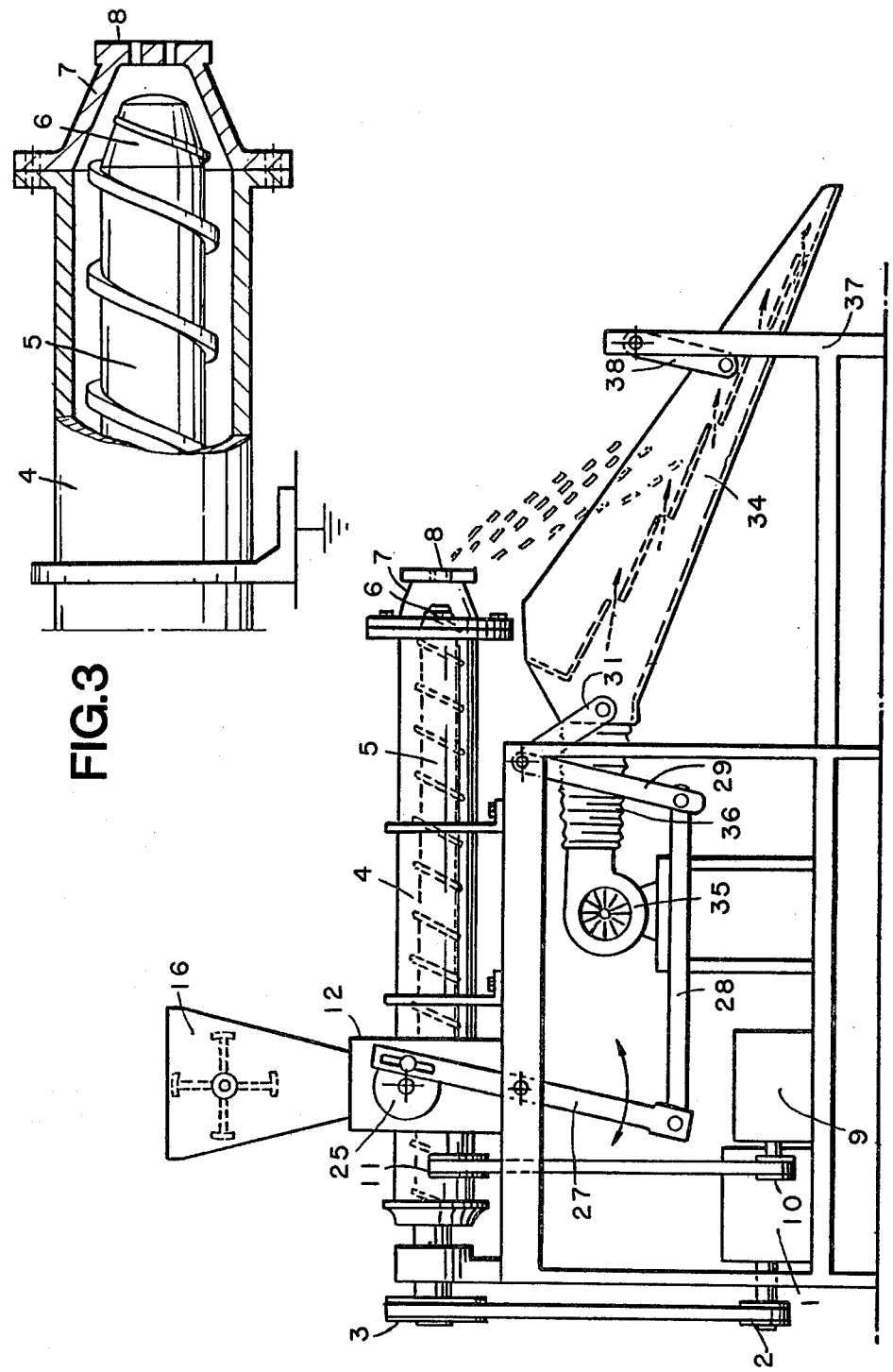

APPARATUS FOR CONTINUOUSLY EXTRUDING AND DRYING/COOLING CEREAL BRAN

FIELD OF THE INVENTION

This invention relates to an apparatus for the continuous extrusion, stabilization, pelletization and drying-/cooling of rice bran and/or other cereal bran which are by-products from milling.

Conventional types of apparatus, which have been used as extruders, have usefully been employed for cereal expansion or starch gelatinization. However, those extruders are not adapted for the stabilization, pelletization and drying/cooling of rice bran or other cereal bran (hereinafter, simply referred to as the "bran").

Korean Utility Model application No. 1350/1980, filed on Mar. 5, 1980 and published 27, Jan. 1982, by the same inventors as herein, discloses an excellent extruder in which a main screw with a rotation rate of 400-1200 rpm and a feed screw with an endlessly changeable rotation rate of 0-300 rpm are arranged in a cross position, whereby the raw bran in the barrel can be heated by the heat produced due to the friction between the surface of the main screw and the bran. This extruder ensures the elimination of the disadvantages inherent in the conventional extruders. However, it has been found that when bran is used as the raw material to be treated, it cannot satisfy all the desired conditions, such as lipase inactivation, dryness of the product and pellet formation.

First, a common drawback normally encountered by the conventional extruders is that the flow of raw material from the hopper for feeding the material is not effected evenly. That is, when the raw material contains excess or insufficient moisture or when the material is in the form of a fine particle such as bran, it is not possible to feed the material onto the feed screw uniformly because of the formation of tunnels in the heap of the material inside of the hopper due to the continuous rotation of the feed screw. For this reason, conventional extruders must be equipped with a separate revolution motor by which an agitator can be operated in the hopper for feeding the raw material. However, since the agitator continuously operates, a larger number of tunnels are formed in the heap of the bulky raw material. An attempt was made to solve this problem by using a vibrator; however, it was not practically possible to use the vibrator because the downward flow of the heap of raw material in the hopper was difficult and the oscillative sound from the vibrator was very noisy.

Second, in the conventional extruders, the space between the main screw and the die housing expands suddenly compared to that between the screw and the screw barrel. Therefore, the pressure maintained in the barrel is suddenly reduced in the die housing, thereby producing water vapor in the die housing. Accordingly, when a die with a plurality of nozzles is used, the extrusion rate at each of the nozzles will not be even, and this will likely cause the pellet produced to be weakened and be easily broken into pieces.

Third, most of the conventional extruders are provided only with a circular conical main screw top and a nozzle. These extruders can extrude the material to be treated through one nozzle using the feeding force of the main screw itself; this undesirably takes a long extrusion time and causes an increase in the power consumption. In this case, if a plurality of nozzles are provided in order to obtain a large quantity of the products in a short period of time, the amount of the products extruded from the nozzles at the positions remote from the central nozzle is not identical when it is compared with that from the central nozzle, because the nozzles at the peripheral edges are not exposed to sufficient extrusion force.

Fourth, in the conventional extruders, a D.C. motor is employed for the speed change of the main screw, but when the main and the feed screws rotate at a lower speed, the electrical efficiency of the motor becomes poor. This problem was solved by the extruder as claimed in Korean Utility Model application No. 1350/1981 in which a variable speed motor and a speed reduction means are used. However, in that extruder, the hopper must be arranged at an angle of inclination of about 15° by aid of a worm and a worm gear. Therefore, a problem is likely to present in connection with the safety of the overall apparatus.

Finally, in the conventional apparatus, the raw bran can be dried partially because when the higher pressure acting on the bran in the extruder is reduced suddenly to atmospheric pressure during the extrusion, the moisture contained in the bran evaporizes from the bran to a certain extent, but in view of the stability and the strength of the bran pellets obtained, it is inevitable to dry and cool them secondarily. Therefore, as soon as the pellets are extruded, the pellets must be dried and cooled by a drying cooler, which is installed separately from the extruder, in order to secure the right shape and size of the pellets extruded. In addition, an attempt was made to transfer the extruded pellets onto a conveying device without damaging the original form of the pellets, by using a separate power system or vibrator; however, this may have led to comparatively high power costs and a long working cycle, thereby affecting the economic profitability of the apparatus employed. From the foregoing, it can be noted that in most of the conventional extruders for use in the extrusion of bran, the steps of extrusion and drying/cooling were not conducted in a unitary process. The drying/cooling step should be carried out by collateral systems, and, therefore, it was difficult to enhance the quality of the products and save electric power.

SUMMARY OF THE INVENTION

The primary object of the invention is to provide a simple extruder for the continuous production of pellet-type stabilized bran products. A profitable shortening of the working cycle thus leading to an increased output is made possible by this invention.

Another object of the invention is to provide an extruder in which the extrusion and the drying/cooling can be carried out in a single step.

A further object of the invention is to provide an extruder in which the formation of a tunnel in the heap of the raw material on feeding could be avoided.

Still another object of the invention is to provide an extruder which ensures the formation of the product with uniform size and enhanced strength.

A further object of the invention is to provide an extruder which can readily be manufactured at low cost and simply operated.

These and other objects can be achieved by the apparatus of the invention which comprises a feed screw extending horizontally from the bottom of a hopper; a main screw arranged in the cross direction to said feed screw at a proper position spaced under said feed screw; a frustoconical main screw top which is secured to the end of said main screw, said top being provided with a flight therearound; an agitating means positioned in said hopper, said means being operated intermittently by way of a ratchet gear system being operated by the revolution of said feed screw; a drying/cooling device vibrating at a certain angle of inclination; and a blower system which is connected directly to said drying/cooling device.

According to an embodiment of the invention, the feed and the main screws are positioned in the barrels covering each of them, and each rotate at a different rotation speed by means of a different driving system. When the feed screw rotates at 60–80 rpm, the main screw preferably rotates at the range of 900–1000 rpm. The raw bran which has been fed onto the main screw is heated to a high temperature by the frictional heat produced between the main screw and the barrel. At this step, the temperature and the pressure in the barrel depend upon both of the amount of the raw bran fed and the rotation speed of the main screw, but it is necessary to maintain the temperature between 100° and 200° C.

The main screw top positioned in the die housing has the shape of a frustoconical and its front end is provided with a hemispherical head. Advantageously, the height of the thread defined on the top is about one-half of that on the main screw. This is necessary for minimizing the power consumption and for preventing the sudden depression of the pressure in the space of the die housing. Also, the employment of such structure will ensure an even extrusion rate at each of the plural nozzles in the die plate and an increase in the coagulative strength of the pellet extruded from the nozzles. The feed screw can be reversely operated by supplying it with a variable speed motor through a speed reduction gear box; so that the hopper can be installed horizontally.

The drying/cooling device comprises a trap composed of 4 to 8 steps which is inclined at about 15° and can vibrate within about 20° in the vertical direction and about 15 cm in the horizontal direction. The cooling air from the blower is introduced into the top inlet of the drying/cooling device through an introductory pathway. The pellet-type products stabilized by drying and cooling, while passing the drying/cooling device, may be packaged directly or transferred to the packaging division by another conveyer system.

The agitating blades intermittently operate by a ratchet wheel, which is driven by the driving power of the feed screw, and the blades will sufficiently prevent the formation of tunnels in the heap of raw materials in the hopper.

BRIEF DESCRIPTION OF THE DRAWINGS

FIG. 2 is a side elevation view of the apparatus illustrated in FIG. 1;

FIG. 3 is an enlarged framentary side elevation view partially cut away to show interior details of the die housing of the apparatus illustrated in FIG. 1;

DETAILED EMBODIMENTS OF THE INVENTION

Figure 1:
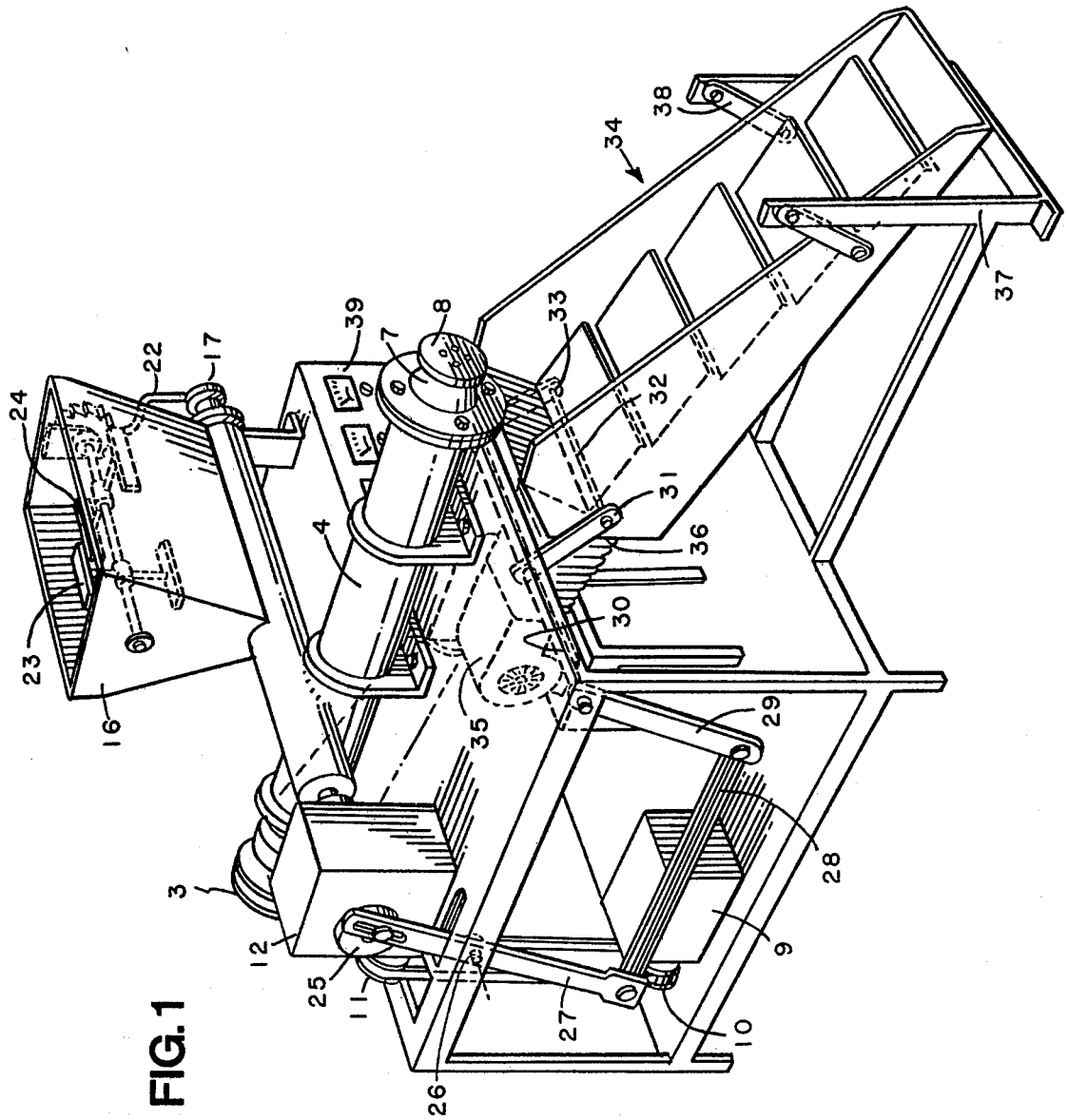
FIG. 1 is a top perspective view of the apparatus of the invention.

Referring now to FIGS. 1 to 4, a first motor 1 drives a main screw 5 disposed in a barrel 4 through a pair of reducer pulleys 2 and 3. The other end of the main screw 5 is fitted by a circular frustoconical top 6 on which a thread is provided. This top 6 may be molded integrally with respect to the main screw 5 or may be in a removable form. A removable form is preferable in view of the variable work thereof. The height of the thread of the main screw 5 to that of the top 6 is preferably about 2:1. When the top 6 is completely assembled, a frustoconical die housing 7 and a flange of the barrel 4 are bolted together, and a die plate 8 with a plurality of nozzles therein also is finally bolted to the other end of the housing.

A second motor 9 drives a feed screw 13 connected with a reduction gear box 12 through a pair of pulleys 10 and 11. One end of the shaft of the feed screw 13 is coupled with the shaft of the worm wheel in the reducing gear box 12. The shaft of the pulley 11 thus rotates the feed screw 13 connected with the worm wheel 14. The threaded portion of the feed screw 13 is positioned beneath the feeding port of the bottom of the hooper 16 as in a conventional hopper structure.

It is important that the main screw 5 and the feed screw 13 are disposed at a right angle to each other so that the outlet port of the feed screw 13 can be set apart from and a distance above the inlet port of the main screw 5.

Figure 5:
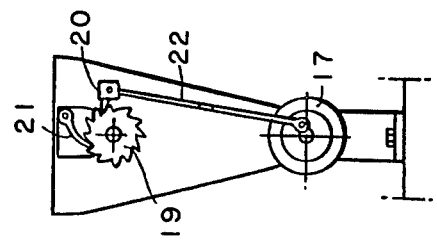
FIG. 5 is a fragmentary front elevation view shown along line A—A of FIG. 4.
Figure 4:
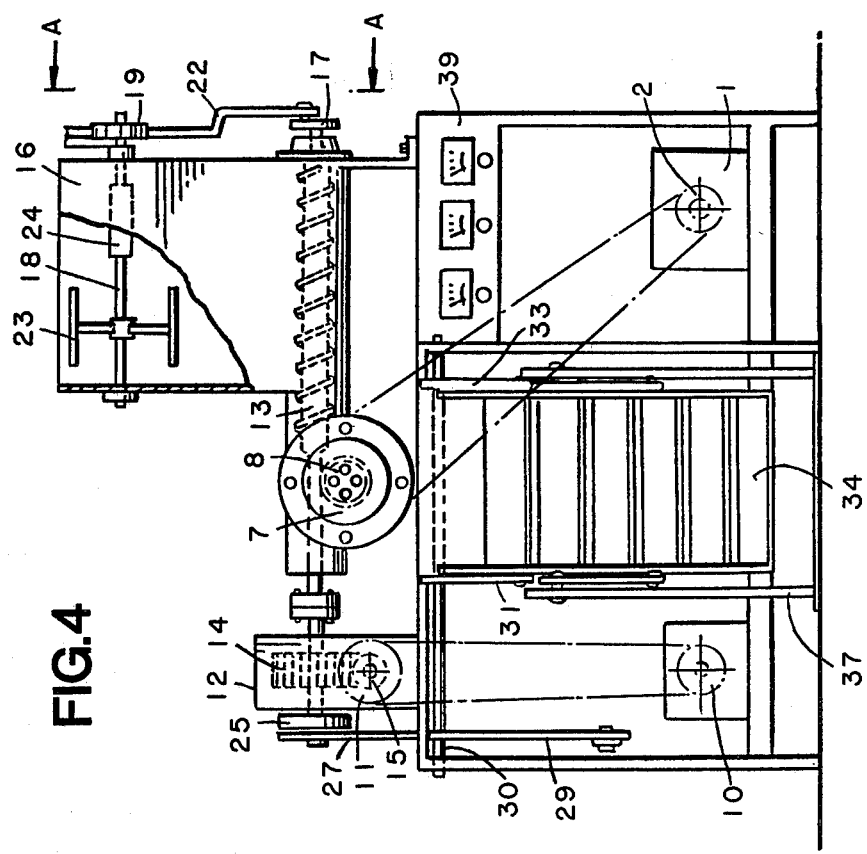
FIG. 4 is a front elevation view of the apparatus illustrated in FIG. 1.

As shown in FIGS. 4 and 5, there is fitted to the other end of the feed screw 13, that is, to the shaft extended outwardly from the hopper 16, a disk-like wheel 17 with an eccentric shaft. Through holes perforated in the upper side portions of the transverse walls of the hopper 16, a rotating rod 18 is inserted. The end of the rod 18, which is inserted through the hopper wall and is disposed above the wheel 17, is coupled with a kind of ratchet wheel 19. With the ratchet wheel 19, a pawl 20 for communicating motion and a checking pawl 21 for preventing backward motion are engaged. The pawl 20 is rotatable around the rotating rod's central axis and the end of the pawl is connected with wheel 17 by reciprocating lever 22. Therefore, when the wheel 17 turns along with the rotation of the feed screw 13, the lever 22 intermittently drives the ratchet wheel 19. At that time, agitating blades 23 and 24, which are fixed in a cross direction to the rod 18, intermittently mix and agitate the raw bran in the hopper 18, thereby preventing the formation of tunnels in the heap of the raw bran and ensuring the uniform feeding of the raw material. The number of the agitating blades may be increased or decreased as desired.

Turning now to FIGS. 1, 2 and 4, a disk-like wheel 25 with an eccentric axis is fitted to the shaft end of the feed screw 13 opposite to the worm wheel 14, at the outside of the reduction gear box 12. The eccentric axis of the wheel 25 is directly connected to a crank shaft 27 which rotates on a fulcrum 26. The shaft 27 is connected through a connection rod 28 to another connection rod 29. One end of the rod 29 is secured to a rotation rod 30 which is shown by dotted line in FIG. 1. Levers 31 and 33 are each fixed to the center portion and to the other end of the rod 30. The free end of each of the levers 31 and 33 is connected through a transverse rod 32. The combination of the levers 31 and 33 and the rod 32 forms a vibratory member for directly vibrating the drying/cooling device 34 which will be described hereunder.

The vibratory member, as shown in FIG. 1, holds the drying/cooling device 34 thereon. The drying/cooling device 34 has a trap form which is constituted by about four to eight rectangular steps (width:length=about 3:2) and inclined at 15°. A slit is provided between each of the steps so that the air stream from a blower 35 can flow through the slits in the arrowed direction, as shown in FIG. 2. The inlet port of the drying/cooling device 34 and the blower 35 are connected to each other through a bellow 36. The drying/cooling device 34 is coupled with the apparatus by means of a support 37 and suspended shakably on the support 37 by means of another support 38. The upper end of the drying-/cooling device 34 is supported by the vibratory member assembled by the rods 31, 32, and 33.

The operation of the extruder of the invention starts with the rotation of each of the feed screw 13 and the main screw 5 at a predetermined rotation speed. At the same time, the wheels 17 and 25 rotate, and, thereby, the agitating blades 23 and 24 rotate and the crank shaft 27 reciprocates. The reciprocal movement of the shaft 27 causes the vibratory member formed by the rods 31, 32 and 33 to vibrate the drying/cooling device 34. The pellets extruded from the die nozzles of the die plate 8 can be dried and cooled sufficiently by the air supplied from the blower 35 while they are rolling down on the drying/cooling device 34. The extent of the vibration of the device 34 depends upon the operation speed of the apparatus.

The extruder according to the invention is operated by an electrical control system 39 mounted on the illustrated apparatus.

In operation, it is preferred to gradually supply the raw bran containing about 10 to 15% moisture in the amount of about 180 to 240 Kgs. per hour onto the feed screw 13, depending upon the speed increase of the feed screw 13. At this phase, the rotation speed of the feed screw 13 must be within the range of about 60 to 80 rpm and be increased gradually. In this case, it is preferable that the rotation speed of the main screw 5 be about 900 to 1,000 rpm.

In accordance with the invention, the raw bran is charged into the hopper 16 by a conveyor system not shown in the drawings. The raw bran fed onto the main screw 5 by the extrusive force of the feed screw 13 is forced into the die housing 7 while being heated by frictional heat in the space defined between the inner wall of the barrel 4 and the surface of the main screw 5. At this stage, the heating of the raw bran is further facilitated by the mixing action of the spline of the main barrel. By virtue of the increase of the temperature in the barrel, particles of the raw bran are coagulated and thus changed to a thermoplastic material. The raw bran compressed around the main screw top 6 in the die housing is heated to a temperature of 100° to 165° C. The moisture contained in the raw bran can be present in the form of water due to the high inner pressure produced in the extruder. In this manner, the thermoplastic bran coagulated under high temperature and pressure is compressed into the space defined between the top 6 and the housing 7 by the flight provided on the top 6.

The structure of the internal space between the main screw top 6 and the die housing 7 causes, the extrusive pressure on the raw bran to slowly drop; whereby even pressure is distributed on the inner wall of the die plate 8. As a result, the treated bran can be extruded under uniform pressure through each of the nozzles provided in the die plate 8. At this phase, the extruded pellets are suddenly exposed to the atmosphere, and the moisture content of the pellets is decreased to less than 10% due to the rapid pressure drop. Also, at that point, the temperature of the pellets is near the boiling point of water, i.e., about 100° C. Under these conditions, the pellets are apt to be crumbled even by a light external shock. To avoid this, the temperature and the moisture content of the extended pellets are reduced to about 35° C. and 7%, respectively, while passing the drying/cooling device 34, so that the pellets can maintain their rod-like pellet form and the desired strength.

In accordance with the invention, it is possible to produce even sized enzyme inactivated pellets of bran of about 3 mm in diameter and about 20 mm in length. As a result of a test, it has been found that the pellets of bran produced by the extruder of the invention do not reveal any activity of the lipase which was originally contained in the bran. It has also been found that the extruded bran pellets can, by a conventional extraction method, produce edible oils of good quality and in a high yield.

Although a preferred embodiment of the invention has been described herein in detail, it is desired to emphasize that this is for the purpose of illustrating the principles of the invention, and should not necessarily be construed as limiting the invention since it is apparent that those skilled in the art can make many modified arrangements of the invention without departing from the true scope thereof.

What is claimed is:

1. An apparatus for continuously extruding, enzyme inactivating, pelletizing and drying/cooling of cereal bran comprising:
   a feed screw and surrounding barrel extending horizontally from the bottom of a hopper;
   a main screw and surrounding barrel arranged at a right angle to and space below said feed screw and a connecting passage between said barrels a frustoconical top which is secured to the end of said main screw, said top being provided with a flight;
   a housing surrounding said top secured at one end to said main screw surrounding barrel and having an extrusion die with a plurality of openings at the other end;
   an agitating means positioned in said hopper, said means having an intermittently operable ratchet gear drive system connected with said feed screw;
   a vibrational drying and cooling device mounted after said extrusion die at a negative angle of inclination; and a blower system which is operatively connected to said drying and cooling device.

2. The apparatus of claim 1 wherein the revolution of said feed screw is about 60–80 rpm and the revolution of said main screw is about 900–1000 rpm.

3. The apparatus of claim 1 wherein the height of the thread flight on said frustoconical top is ½ of the height of the thread flight on said main screw.

4. The apparatus of claim 1 wherein said main screw and said feed screw are each operated by a separate driving system.

5. The apparatus of claim 1 wherein said agitating means are operated by an intermittent driving system which is connected with one end of the feed screw shaft.

6. The apparatus of claim 1 wherein said drying and cooling device is operated by a vibrating means which is connected with the end of the feed screw shaft.

7. The apparatus of claim 1 wherein said drying and cooling device has a trap form which is consituted by about 4 to 8 rectangular steps and negatively inclined at 15° with respect to the ground.

* * * * *